US008660817B2

(12) United States Patent
Jiang et al.

(10) Patent No.: US 8,660,817 B2
(45) Date of Patent: Feb. 25, 2014

(54) HARDWARE TEST AND DIAGNOSIS SYSTEM AND METHOD

(75) Inventors: Tao Jiang, Hacienda Heights, CA (US); Xiaohua Xie, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1184 days.

(21) Appl. No.: 12/288,099

(22) Filed: Oct. 15, 2008

(65) Prior Publication Data

US 2009/0157356 A1   Jun. 18, 2009

Related U.S. Application Data

(60) Provisional application No. 61/007,645, filed on Dec. 14, 2007.

(51) Int. Cl.
*G01F 11/30* (2006.01)

(52) U.S. Cl.
USPC .......................................................... 702/183

(58) Field of Classification Search
USPC .............. 702/183; 324/765; 703/21; 370/252
See application file for complete search history.

(56) References Cited

U.S. PATENT DOCUMENTS

| | | | |
|---|---|---|---|
| 6,311,149 B1 * | 10/2001 | Ryan et al. | 703/21 |
| 8,131,223 B2 * | 3/2012 | Olgaard | 455/67.14 |
| 2007/0091814 A1 * | 4/2007 | Leung et al. | 370/252 |
| 2009/0091347 A1 * | 4/2009 | Gohel et al. | 324/765 |

* cited by examiner

*Primary Examiner* — Tung S Lau
*Assistant Examiner* — Xiuquin Sun
(74) *Attorney, Agent, or Firm* — Farjami & Farjami LLP

(57) ABSTRACT

There is provided a hardware test and diagnosis system including a diagnostic computer and a cellular communication device. The cellular communication device includes a peripheral chipset on a circuit board and a cellular baseband controller on the circuit board, wherein the cellular baseband controller is configured to execute an agent software on the circuit board. The agent software is configured to communicate with the diagnostic computer, the agent software further configured to communicate with the peripheral chipset, and provide a virtual communication channel between the diagnostic computer and the peripheral chipset.

16 Claims, 2 Drawing Sheets

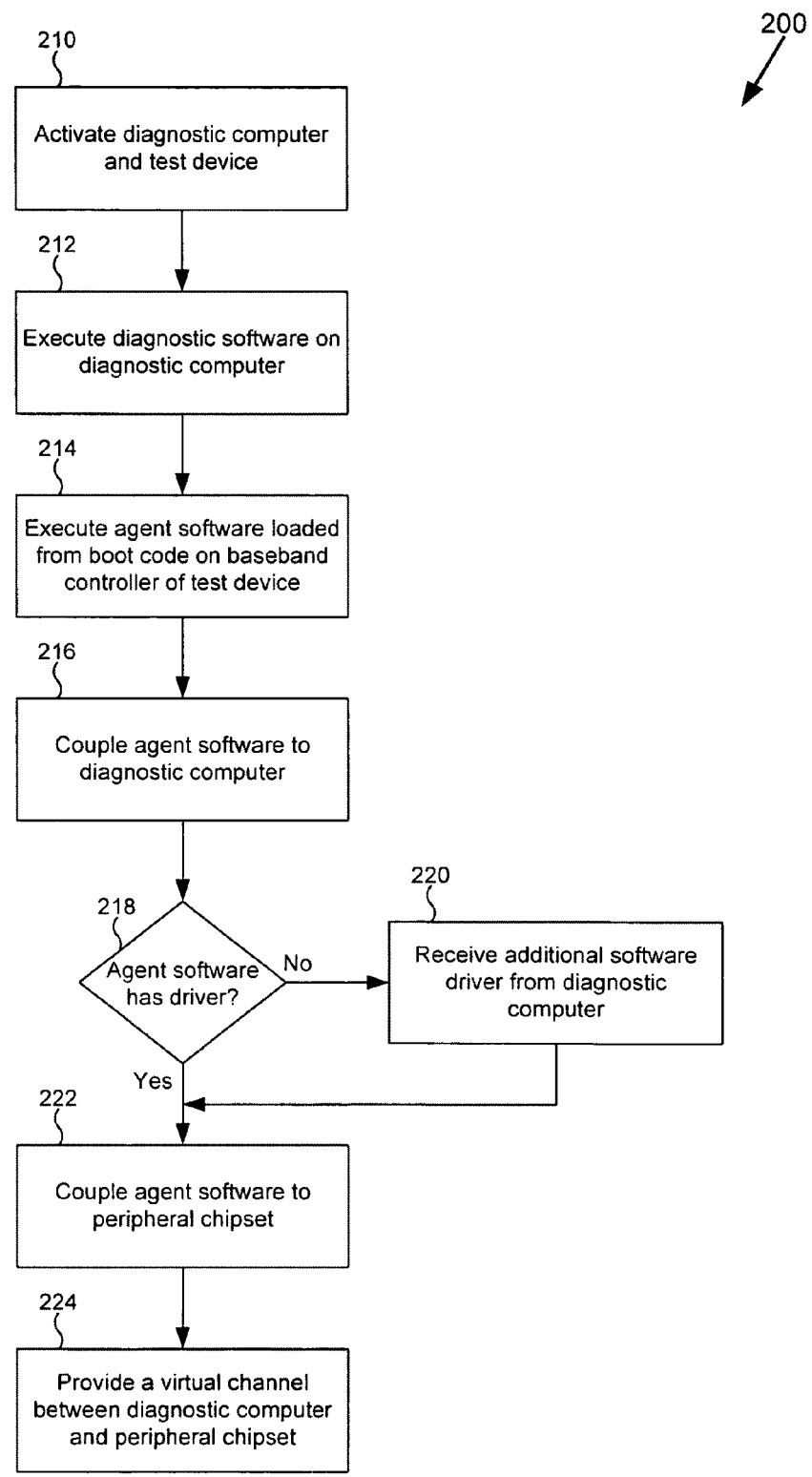

HARDWARE TEST AND DIAGNOSIS SYSTEM AND METHOD

RELATED APPLICATIONS

This application claims priority to U.S. Provisional Application No. 61/007,645, filed on Dec. 14, 2007, which is hereby incorporated by reference in its entirety.

BACKGROUND OF THE INVENTION

1. Field of the Invention

The present invention is generally in the field of hardware testing systems. More particularly, the present invention relates to computerized hardware testing systems.

2. Background Art

The development of modern hardware, such as cellular phone hardware or other portable communication hardware, is presently occurring at a rapid pace, driven in part by intense consumer demand. Bringing modern hardware to market is thus a difficult and time-sensitive enterprise. Unfortunately, the hardware testing and diagnostic steps that must be performed on such modern hardware are complex and time-consuming. For example, hardware testing and diagnostic steps such as hardware verification, debugging, and testing of peripheral chipsets are often delayed for weeks until stable software is available to run on the modern hardware.

The development of modern hardware includes, for example, adding peripheral chipsets to cellular phones for providing additional functionalities, such as, for example, Bluetooth, GPS, FM radio, or WLAN. All these added functionalities on the circuit board of the cellular phone need to be tested as soon as a first version of the cellular phone is ready, so that hardware issues can be resolved before another layout version of the circuit board is prepared, which can take, in the modern practice, two or three weeks. However, the availability of stable software, which can run on the circuit board to activate the added functionalities of the various peripheral chipsets, is often a bottleneck for timely testing of the circuit board. To expedite the hardware testing and diagnosis of modern hardware, various approaches, such as serial MMI ("Man Machine Interface") testing and HCI ("Host Controller Interface") testing, have been utilized. Unfortunately, neither MMI nor HCI testing eliminate the need to have stable software for all the modern hardware features and peripheral chipsets.

Accordingly, there is a need to overcome the drawbacks and deficiencies in the art by offering an improved hardware test and diagnosis system and method.

SUMMARY OF THE INVENTION

A hardware test and diagnosis system and method, substantially as shown in and/or described in connection with at least one of the figures, and as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 shows a flowchart presenting an exemplary method for hardware test and diagnosis, according to one embodiment of the present invention.

DETAILED DESCRIPTION OF THE INVENTION

Figure 1:
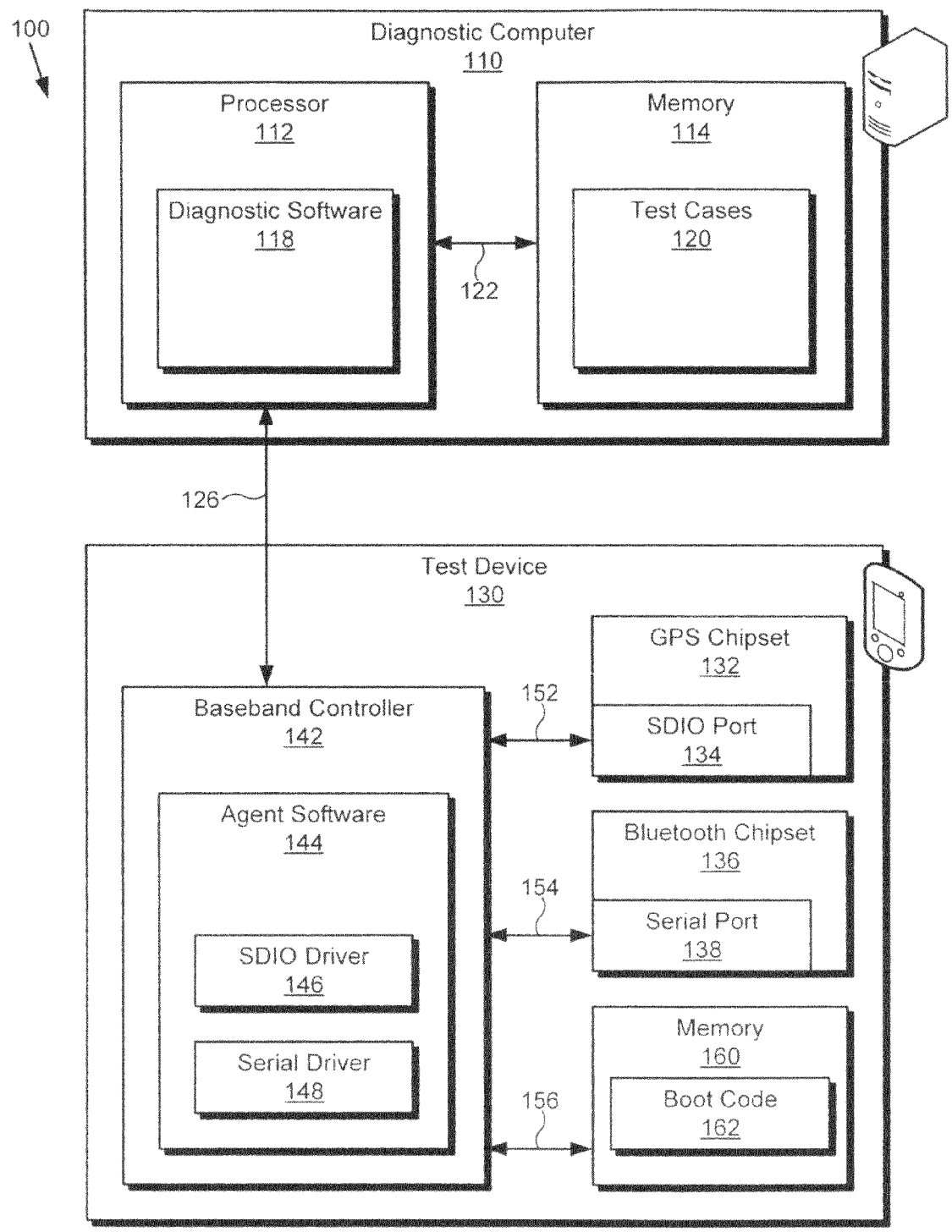
FIG. 1 shows a diagram of an exemplary system for hardware test and diagnosis, according to one embodiment of the present invention.

The present invention is directed to a hardware test and diagnosis system and method. Although the invention is described with respect to specific embodiments, the principles of the invention, as defined by the claims appended herein, can obviously be applied beyond the specific embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

FIG. 1 shows exemplary system 100 according to one embodiment of the present invention. System 100 comprises diagnostic computer 110 and test device 130. Diagnostic computer 110 in one embodiment is, for example, a desktop computer, and test device 130 is, for example, a prototype cellular phone. In one embodiment, diagnostic computer 110 is implemented as a portable computer or a special-purpose diagnostic computer, for example, for use by a technician, while in another embodiment diagnostic computer 110 may be automated such that a technician is not required. Test device 130 is, in one embodiment, a cellular phone, a personal digital assistant, another portable communication device, or, for example, another electronic device. Being a prototype, test device 130 requires testing because, for example, test device 130 contains in one embodiment unique combinations of peripheral chipsets that have been recently designed. The unique combinations may contain unknown design defects that must be discovered, or may utilize components that interact in an unpredictable way. Diagnostic computer 110 is configured for use in performing hardware testing and diagnostic steps such as hardware verification, debugging, and testing of the peripheral chipsets of test device 130 (e.g. GPS ("Global Positioning System") chipset 132 and Bluetooth chipset 136).

In one embodiment, diagnostic computer 110 comprises processor 112 and memory 114. Diagnostic computer 110 also comprises, for example, interfaces for input and output that are known in the art, such as a display, a mouse and keyboard, and an Input/Output port utilizing a protocol to support connection 126, that are not shown in FIG. 1. The Input/Output port may utilize a protocol such as, for example, an I2C protocol, USB protocol, UART protocol, SPI protocol, CAN protocol, Async protocol, PS/2 protocol, 1-Wire protocol, SM Bus protocol, Parallel protocol, Click and Drag Bus protocol, PCM bus protocol, SDIO protocol, or I2S bus protocol. Processor 112 of diagnostic computer 110 is configured to execute software, including diagnostic software 118, and is further configured to communicate with baseband controller 142 of test device 130 and with memory 114 via connections 126 and 122, respectively. Memory 114 of diagnostic computer 110 is configured in one embodiment to store software; for example, test cases 120 is stored in memory 114 for use during testing of test device 130. Test cases 120 comprises, for example, hardware verification, debugging, and testing routines.

In one embodiment, test device 130 comprises baseband controller 142, GPS chipset 132, Bluetooth chipset 136, and memory 160. Baseband controller 142 is implemented in one embodiment as a controller or microprocessor configured for executing code for a cellular phone, other portable communication device, or other electronic device, for example, and is configured to communicate with GPS chipset 132, Bluetooth chipset 136, and memory 160 via connections 152, 154, and 156, respectively. In one embodiment, baseband controller 142 is situated on a circuit board of test device 130, and has integrated circuit pins or other baseband controller endpoints coupled to GPS chipset 132, Bluetooth chipset 136, and memory 160 via circuit board interconnects as known in the art.

The peripheral chipsets of test device 130 shown in FIG. 1, such as in one embodiment GPS chipset 132 and Bluetooth chipset 136, each comprise a port configured for communication with baseband controller 142. For example, GPS chipset 132 comprises SDIO port 134 configured to communicate with baseband controller 142 utilizing a SDIO protocol via connection 152, and Bluetooth chipset 136 comprises serial port 138 configured to communicate with baseband controller 142 utilizing a serial protocol via connection 154. In one embodiment, GPS chipset 132 additionally comprises, for example, a GPS antenna and GPS controller, and Bluetooth chipset 136 additionally comprises, for example, a Bluetooth antenna and Bluetooth controller. Additional peripheral chipsets (not shown) besides GPS chipset 132 and Bluetooth chipset 136 may, in one embodiment, be selected from the group consisting of, for example, an LCD chipset, a camera chipset, a PMU chipset, an FM radio chipset, a Flash memory chipset, an SDRAM chipset, an SRAM chipset, an audio DAC chipset, a keypad chipset, a SIM chipset, a WLAN chipset, and an infrared chipset. Such additional peripheral chipsets may be configured, in one embodiment, to communicate with baseband controller 142 utilizing various protocols such as, for example, an I2C protocol, USB protocol, UART protocol, SPI protocol, CAN protocol, Async protocol, PS/2 protocol, 1-Wire protocol, SM Bus protocol, Parallel protocol, Click and Drag Bus protocol, PCM bus protocol, SDIO protocol, or I2S bus protocol, as known in the art.

In one embodiment, baseband controller 142 is not implemented with hardware ports for communicating with peripheral chipsets such as GPS chipset 132. For example, in one embodiment baseband controller 142 is not implemented with a hardware SDIO port configured to communicate with SDIO port 134 of GPS chipset 132, or with a hardware serial port configured to communicate with serial port 138 of Bluetooth chipset 136. Instead, in one embodiment agent software 144 comprises, for example, SDIO driver 146 and serial driver 148. SDIO driver 146 is implemented, for example, as a driver configured to operate the integrated circuit pins or other baseband controller endpoints of baseband controller 142 coupled to SDIO port 134 via connection 152. Similarly, serial driver 148 is implemented, for example, as a driver configured to operate the integrated circuit pins or other baseband controller endpoints of baseband controller 142 coupled to serial port 138 via connection 154. By utilizing such a driver in agent software 144, baseband controller 142 can in one embodiment thus mimic or emulate the operation of a hardware port configured to communicate with a peripheral chipset.

In one embodiment, agent software 144, embedded in boot code 162, is provided for execution to baseband controller 142 by memory 160 during activation of test device 130. Prior to activation, test device 130 is, in one embodiment, powered off. During activation, after being powered on, test device 130 utilizes boot code 162 (including, in one embodiment, agent software 144) to set initial parameters of test device 130 and also to provide agent software 144 to baseband controller 142. Agent software 144 is configured after being provided for execution to baseband controller 142, in one embodiment, for communication via connection 126, as well as via connections 152 and 154. In one embodiment agent software 144 is also configured to for communication via connection 156 to memory 160, to utilize memory 160 after activation. Agent software 144 thus in one embodiment can establish a virtual channel between diagnostic software 118 of diagnostic computer 110 and the peripheral chipsets of test device 130. Utilizing the virtual channel, in one embodiment diagnostic computer 110 can, for example, issue commands directly to peripheral chipsets of test device 130, configure and reconfigure the peripheral chipsets into various modes, and receive messages from the peripheral chipsets indicating success or failure of, for example, test cases 120 in memory 114.

In one embodiment, during activation of test device 130, agent software 144 is provided for execution comprising only SDIO driver 146, for example, but not serial driver 148. Thus provided, agent software 144 is configured, in one embodiment, for communication with GPS chipset 132 (which comprises SDIO port 134), but is not configured for communication with Bluetooth chipset 136 (which comprises serial port 138). Serial driver 148 may be omitted from agent software 144 at activation for various reasons. For example, in one embodiment serial driver 148 may be omitted because Bluetooth chipset 136 has been added to test device 130 more recently than boot code 162 has been updated, and thus boot code 162 comprises agent software 144 comprising only SDIO driver 146. In such a circumstance, agent software 144 is configured, in one embodiment, to receive an additional software (e.g., serial driver 148) from diagnostic software 118 of diagnostic computer 110 after test device 130 has been activated. Using this technique, agent software 144 can be expanded with additional software to test additional, or new, peripheral chipsets of test device 130.

By coupling agent software 144 to diagnostic software 118 of diagnostic computer 110 and to a peripheral chipset, e.g. GPS chipset 132, of test device 130, as described above, a virtual channel is provided between diagnostic computer 110 and the peripheral chipset. Utilizing the virtual channel, in one embodiment diagnostic computer 110 can, for example, issue commands, configure the peripheral chipsets, and receive messages from the peripheral chipsets. Diagnostic computer 110 can thus utilize test cases 120 in memory 114 (e.g., hardware verification, debugging, and testing routines) to communicate directly with the peripheral chipset and test the peripheral chipset extensively.

FIG. 2 shows flowchart 200 of an exemplary method for hardware test and diagnosis, according to one embodiment of the present invention. Certain details and features have been left out of flowchart 200 that are apparent to a person of ordinary skill in the art. For example, a step may comprise one or more substeps or may involve specialized equipment or materials, as known in the art. While steps 210 through 224 indicated in flowchart 200 are sufficient to describe one embodiment of the present invention, other embodiments of the invention may utilize steps different from those shown in flowchart 200.

In step 210 of flowchart 200, a diagnostic computer corresponding to diagnostic computer 110 in FIG. 1 is activated, and a test device corresponding to test device 130 is activated. In one embodiment, the diagnostic computer is configured to perform hardware testing and diagnostic steps such as hardware verification, debugging, and testing of peripheral chipsets of the test device, while the test device is, for example, a prototype device containing unique combinations of peripheral chipsets that may contain unknown design defects that must be discovered. The activation of the diagnostic computer and the test device includes, for example, powering on the diagnostic computer and the test device, and coupling the diagnostic computer and the test device utilizing, for example, a serial cable.

After activation, in step 212 of flowchart 200 a diagnostic software corresponding to diagnostic software 118 is executed on the diagnostic computer. The diagnostic software is configured to communicate with the test device, and is further configured to communicate with a memory corresponding to memory 114. The memory is configured to store, for example, test cases corresponding to test cases 120 which comprise, for example, hardware verification, debugging, and testing routines. The diagnostic software can retrieve the test cases in preparation for subsequent testing via a virtual channel, as described below.

In step 214 of flowchart 200, an agent software corresponding in one embodiment to agent software 144, embedded in a boot code corresponding to boot code 162, is executed after being provided to a baseband controller corresponding to baseband controller 142. The baseband controller is implemented in one embodiment as a controller or microprocessor configured for executing code for, for example, a cellular phone, other portable communication device, or other electronic device. Additionally, the baseband controller is in one embodiment situated on a circuit board of the test device, and has integrated circuit pins or other baseband controller endpoints coupled to peripheral circuits of the test device via circuit board interconnects as known in the art. Also, the baseband controller is configured, in one embodiment, to communicate with the peripheral chipsets of the test device, such as a GPS chipset corresponding to GPS chipset 132, and a Bluetooth chipset corresponding to Bluetooth chipset 136. In one embodiment, the agent software is executed after the test device utilizes the boot code to set initial parameters of the test device and to provide the agent software to the baseband controller.

In step 216 of flowchart 200, after executing the agent software on the baseband controller, and after executing the diagnostic software on the diagnostic computer, the agent software is coupled to the diagnostic software. Previously, during step 210, in one embodiment the diagnostic computer and the test device were coupled utilizing, for example, a serial cable. In step 216, in one embodiment the agent software uses an included driver corresponding to serial driver 148 to initiate a serial connection to the diagnostic computer.

After step 216, in step 218 the agent software determines whether the agent software also includes a driver corresponding to, for example, serial driver 148 to couple to, for example, a peripheral chipset corresponding to Bluetooth chipset 136. If so, flowchart 200 proceeds to step 222, but if not, flowchart 200 proceeds to step 220. Notably, a driver is required because although the peripheral chipsets of the test device each comprise a port (e.g., serial port 138) configured for communication with the baseband controller, in one embodiment the baseband controller is not implemented with hardware ports for communicating with those peripheral chipset ports. Consequently, in one embodiment the agent software utilizes drivers configured to operate the integrated circuit pins or other baseband controller endpoints of the baseband controller coupled to the peripheral chipsets, thereby mimicking or emulating the operation of a hardware port configured to communicate with the peripheral chipsets.

In an embodiment wherein the agent software determines that the agent software does not include a driver suitable for communicating with a peripheral chipset, in step 220 the agent software is configured, for example, to receive additional software, e.g. an additional driver, from the diagnostic computer. The agent software may not include such a driver for various reasons. For example, the driver may be omitted because, for example, the peripheral chipset has been included more recently than the boot code has been updated, and thus the boot code comprises the agent software lacking the driver. By including this technique, in one embodiment of the invention the agent software can be expanded with additional drivers to test additional, or new, peripheral chipsets of the test device. Subsequently, flowchart 200 proceeds to step 222.

In step 222, the agent software is coupled to the peripheral chipset of the test device. To do so, the agent software executes a driver either loaded with the boot code or received from the diagnostic software, as discussed above. The driver enables the baseband controller to mimic or emulate the operation of a hardware port configured to communicate with the peripheral chipset. Thus, the agent software has been coupled both to the diagnostic computer, as described in step 216, and to the peripheral chipset. Flowchart 200 thus proceeds to step 224.

In step 224, a virtual channel is provided between the diagnostic computer and the peripheral chipset. Previously, the diagnostic software was configured to communicate with the test device and the memory of the diagnostic computer, and the diagnostic software was also coupled via the agent software to the peripheral chipset of the test device. Utilizing the virtual channel, in one embodiment the diagnostic computer can, for example, issue commands directly to peripheral chipsets of the test device, configure and reconfigure the peripheral chipsets into various modes, and receive messages from the peripheral chipsets indicating success or failure of, for example, test cases corresponding to test cases 120. The diagnostic computer can thus utilize the test cases (e.g., hardware verification, debugging, and testing routines) to communicate directly with the peripheral chipset and test the peripheral chipset extensively.

In the manner described above, embodiments of the present invention as shown in exemplary system 100 and in exemplary flowchart 200 presents an improved hardware test and diagnosis system while overcoming the drawbacks of conventional solutions. In one embodiment, an agent software executing on a baseband controller of a test device provides a virtual channel between a diagnostic computer and a peripheral chipset, for example, as described above. The drawbacks of conventional solutions, which include, for example, waiting out long delays for stable software to run on the test device to activate the added functionalities of the various peripheral chipsets, are avoided.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A hardware test and diagnosis system comprising:
a diagnostic computer; and
a cellular communication device comprising:
   a peripheral chipset on a circuit board, the peripheral chipset having a plurality of modes of operation and supporting at least one of the Bluetooth, GPS, FM radio and WLAN functionalities; and
   a cellular baseband controller on the circuit board, wherein the cellular baseband controller is configured to execute an agent software on the circuit board;
wherein the agent software is configured to communicate with the diagnostic computer, the agent software further configured to communicate with the peripheral chipset, and provide a virtual communication channel between the diagnostic computer and the peripheral chipset via the cellular baseband controller, the diagnostic computer issuing commands passing through the cellular baseband controller and directed to the peripheral chipset using the virtual communication channel, wherein the commands configure the peripheral chipset in various modes of the plurality of modes of operation for testing the functionalities of the peripheral chipset in each mode of the plurality of modes of operation using the virtual communication channel by communicating messages between the diagnostic computer and the peripheral chipset.

2. The system of claim 1, the agent software comprising a driver configured for communication with the peripheral chipset.

3. The system of claim 1, the agent software further configured to receive an additional software from the diagnostic computer.

4. The system of claim 1, wherein the agent software is embedded in a boot code stored in a memory of the cellular communication device.

5. The system of claim 1, wherein the agent software is embedded in the cellular baseband controller.

6. The system of claim 1, wherein the agent software comprises a driver configured to emulate a hardware port operation for communication with the peripheral chipset without using a hardware port.

7. The system of claim 1, the agent software further configured to communicate with the diagnostic computer via a protocol selected from the group consisting of I2C protocol, USB protocol, UART protocol, SPI protocol, CAN protocol, Async protocol, PS/2 protocol, 1-Wire protocol, SM Bus protocol, Parallel protocol, Click and Drag Bus protocol, PCM bus protocol, SDIO protocol, and I2S bus protocol.

8. The system of claim 1, the agent software further configured to communicate with the peripheral chipset via a protocol selected from the group consisting of I2C protocol, USB protocol, UART protocol, SPI protocol, CAN protocol, Async protocol, PS/2 protocol, 1-Wire protocol, SM Bus protocol, Parallel protocol, Click and Drag Bus protocol, PCM bus protocol, SDIO protocol, and I2S bus protocol.

9. A method for coupling a diagnostic computer and a peripheral chipset of a cellular communication device via a cellular baseband controller of the cellular communication device, the method comprising:
   executing an agent software by the cellular baseband controller on a circuit board;
   communicating between the agent software and the diagnostic computer;
   communicating between the agent software and the peripheral chipset on the circuit board, the peripheral chipset having a plurality of modes of operation and supporting at least one of the Bluetooth, GPS, FM radio and WLAN functionalities; and
   providing a virtual communication channel between the diagnostic computer and the peripheral chipset via the cellular baseband controller, the diagnostic computer issuing commands passing through the cellular baseband controller and directed to the peripheral chipset using the virtual communication channel, wherein the commands configure the peripheral chipset in various modes of the plurality of modes of operation for testing the functionalities of the peripheral chipset in each mode of the plurality of modes of operation using the virtual communication channel by communicating messages between the diagnostic computer and the peripheral chipset.

10. The method of claim 9, the agent software comprising in communication with the peripheral chipset.

11. The method of claim 9, further comprising receiving by the agent software an additional software from the diagnostic computer.

12. The method of claim 9, wherein the agent software is embedded in a boot code stored in a memory of the cellular communication device.

13. The method of claim 9, wherein the agent software is embedded in the cellular baseband controller.

14. The method of claim 9, wherein the agent software comprises a driver emulating a hardware port operation for communication with the peripheral chipset without using a hardware port.

15. The method of claim 9, wherein the agent software communicates with the diagnostic computer via a protocol selected from the group consisting of I2C protocol, USB protocol, UART protocol, SPI protocol, CAN protocol, Async protocol, PS/2 protocol, 1-Wire protocol, SM Bus protocol, Parallel protocol, Click and Drag Bus protocol, PCM bus protocol, SDIO protocol, and I2S bus protocol.

16. The method of claim 9, wherein the agent software communicates with the peripheral chipset via a protocol selected from the group consisting of I2C protocol, USB protocol, UART protocol, SPI protocol, CAN protocol, Async protocol, PS/2 protocol, 1-Wire protocol, SM Bus protocol, Parallel protocol, Click and Drag Bus protocol, PCM bus protocol, SDIO protocol, and I2S bus protocol.

* * * * *